United States Patent

Sberveglieri

[11] Patent Number: 5,819,625
[45] Date of Patent: Oct. 13, 1998

[54] DOUBLE BEVEL TABLE SAW

[75] Inventor: Umberto Sberveglieri, Novellara, Italy

[73] Assignee: Black & Decker Inc., Newark, Del.

[21] Appl. No.: 831,551

[22] Filed: Apr. 9, 1997

Related U.S. Application Data

[63] Continuation of Ser. No. 571,014, Dec. 12, 1995, abandoned.

[30] Foreign Application Priority Data

Dec. 12, 1994 [GB] United Kingdom .................. 9425390

[51] Int. Cl.⁶ .............................. B23D 45/06; B27B 5/20
[52] U.S. Cl. ..................... 83/471.3; 83/102.1; 83/473; 83/477.1; 83/477.2; 83/486.1; 83/581
[58] Field of Search ................. 83/102.1, 471.3, 83/473, 477.1, 477.2, 485, 486, 486.1, 581

[56] References Cited

U.S. PATENT DOCUMENTS

| | | | |
|---|---|---|---|
| 2,121,069 | 6/1938 | Collins | 83/473 |
| 2,299,262 | 10/1942 | Uremovich | 83/473 |
| 2,465,000 | 3/1949 | Turner | 83/473 |
| 2,518,684 | 8/1950 | Harris | 83/473 X |
| 2,850,054 | 9/1958 | Eschenburg | 83/473 |
| 3,005,477 | 10/1961 | Sherwen | 83/471.3 |
| 3,013,592 | 12/1961 | Ambrosio et al. | 83/473 |
| 3,124,178 | 3/1964 | Packard | 83/473 |
| 3,344,819 | 10/1967 | Mitchell | 83/486.1 X |
| 4,184,394 | 1/1980 | Gjerde | 83/477.1 |
| 4,607,555 | 8/1986 | Erhard | 83/477.2 X |
| 4,964,449 | 10/1990 | Conners | 83/477.1 X |
| 5,159,869 | 11/1992 | Tagliaferri | 83/477.2 X |

FOREIGN PATENT DOCUMENTS

| | | | |
|---|---|---|---|
| 1363254 | 5/1964 | France | 83/473 |
| 1447793 | 10/1966 | France . | |
| 3640784 | 3/1988 | Germany . | |
| 15177 | 3/1914 | United Kingdom . | |
| 2249991 | 5/1992 | United Kingdom . | |

*Primary Examiner*—Clark F. Dexter
*Attorney, Agent, or Firm*—Adan Ayala

[57] ABSTRACT

A bevel table saw 10 comprising a table 14 supported by a frame 12, the table 14 defining a slit 16 for a saw blade 72, a blade assembly 54 mounted to the frame 12 below the table 14 such that, in use, a saw blade 72 of the blade assembly 54 protrudes through the slot 16, the blade assembly 54 comprising a motor 57 having a drive shaft 58, a layshaft 64 driven by the drive shaft 58 and a blade axle 70 for carrying a saw blade 72 driven the layshaft 64, wherein the layshaft 64 drives the blade axle 70, in use, by a linkage 66 substantially parallel to the saw blade 72 running from the blade axle 70 to one end of the layshaft 64, the other end of the layshaft being spaced from the saw blade 72 and driven by the drive shaft 58 of the motor 57, the motor 57 being positioned substantially directly below the blade axle 70 such that the saw blade 72 can be swung in either direction through an angle of 45° to make bevel cuts in workpieces positioned on the table 14.

21 Claims, 6 Drawing Sheets

DOUBLE BEVEL TABLE SAW

This application is a Continuation of application Ser. No. 08/571,014, filed Dec. 12, 1995, now abandoned.

BACKGROUND OF THE INVENTION

This invention relates to table saws, and in particular to a table saw wherein the saw blade can be angled to make bevel cuts in a workpiece mounted on the table.

Table saws incorporate a table having a through-slot for accommodating a saw blade. A drive for the saw blade is accommodated below the table surface so that only a portion of the saw blade is exposed above the table surface. As a result, to cut a workpiece, a workpiece can be either moved past the rotating saw blade or held firmly overlying the slot in the table while the saw blade is drawn along the slot (which in this case is much longer) and through the workpiece. Such table saws are well known.

Bevel table saws, essentially the same as the table saws described above, are also known wherein the angle of the saw blade can be adjusted to allow angled or bevel cuts to be made in a workpiece positioned on the table.

Problems arise with many of the prior art bevel table saws by virtue of the fact that the motor which drives the saw blade is, of necessity, relatively large and can clash with either the underside of the table or other support structure below the table surface when the orientation of the saw blade is being changed. Accordingly, many prior art bevel table saws allow the saw blade to be angled only in one direction away from the vertical, rather than in both directions. In the light of this, the present invention aims to improve upon the known prior art bevel table saws by providing an arrangement which allows the saw blade to be angled relative to the vertical in both directions to produce bevel cuts.

SUMMARY OF THE INVENTION

According to the present invention, there is provided a bevel table saw comprising a table supported by a frame, the table defining a slot for a saw blade, a blade assembly mounted to the frame below the table such that, in use, a saw blade of the blade assembly protrudes through the slot, the blade assembly comprising a motor having a drive shaft, a layshaft driven by the drive shaft and a blade axle for carrying a saw blade driven by the layshaft, wherein the layshaft drives the blade axle, in use, by means of a linkage substantially parallel to the saw blade running from the blade axle to one end of the layshaft, the other end of the layshaft being spaced from the saw blade and driven by the drive shaft of the motor, the motor being positioned substantially directly below the blade axle such that the saw blade can be swung in either direction through an angle of 45° to make bevel cuts in workpieces positioned on the table.

By centering the position of the motor below the blade axle (and hence in line with the saw blade itself), a more compact arrangement is provided which allows pivoting of the saw blade in both directions.

Preferably the blade assembly is supported by a carriage which is mounted on the frame for longitudinal and angular motion relative to the frame.

Preferably the blade axle carries a pair of washers between which a saw blade is held, in use, at least one of the washers providing a pulley for engagement with a linkage from the layshaft.

The blade axle is preferably supported on either side of he saw blade by bearings. Once again, this arrangement enables a more compact assembly to be provided.

The blade axle preferably straddles an opening between a pair of arms forming a part of the blade assembly.

The arms of the blade assembly preferably accommodate the bearings which are held in position by circlips.

The linkage between the blade axle and the layshaft may be a belt. Alternatively, a chain and sprocket or any other appropriate linkage arrangement could be used.

Preferably the layshaft is mounted substantially perpendicularly to the saw blade, the axis of the layshaft being parallel to the axis of the blade axle and the axis of the drive shaft.

Preferably means are provided for adjusting the height of the saw blade relative to the table surface.

Further, the adjusting means may include a support for a riving knife which, in use, follows the saw blade, the adjusting means being arranged to keep the riving knife at substantially the same orientation relative to the saw blade irrespective of the height of the saw blade.

The adjusting means may comprise a quadrilateral linkage arrangement incorporating at least one pivot point fixed to the carriage which carries the blade assembly.

The adjusting means may comprise a worm drive which engages a pinion to raise and lower the blade assembly, and hence the saw blade, relative to the table surface.

BRIEF DESCRIPTION OF THE DRAWINGS

Specific embodiments of the present invention are now described, by way of example only, with reference to the accompanying drawings, in which:

FIG. 3a is a schematic view showing the degree of beveling permissible for the saw blade in one embodiment and a corresponding envelope A for the motor and blade assembly.

DETAILED DESCRIPTION

Figure 1:
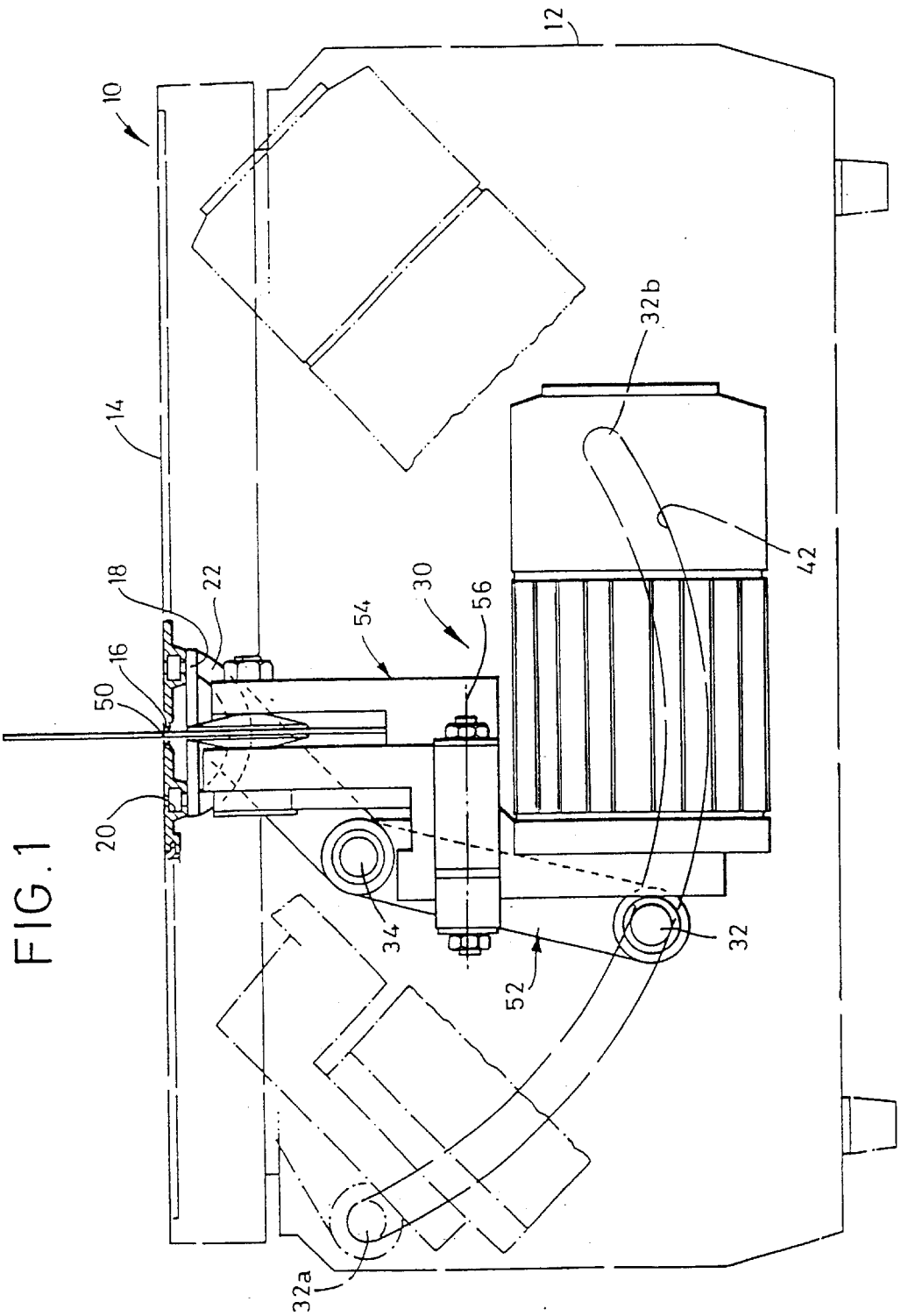
FIG. 1 is a front view of a double bevel table saw according to the present invention.

A double bevel table saw 10 according to the present invention comprises a frame 12 having a table 14 in which is formed a long through-slot 16.

At each end of the table 14, at the ends of the slot 16, a half-round bracket 18 is fixed in channels 20 formed in the underside of the table 14 on either side of the slot 16. The bracket 18 has a half-round track 22 whose centre 50 coincides with the top surface of table 14 and the line of the slot 16.

Engaged with the tracks 22 for sliding, arcuate movement thereon is a saw assembly 30. The saw assembly 30 comprises two parallel bars 32,34 secured between end frames 36,38. The end frames 36,38 each have a short, arcuate channel section 40 for engagement with the tracks 22. An extension of the bar 32 protrudes through a slot 42 in a front end face 44 of the frame 12 and has a knob 46. Grasping the knob 46 enables the user to pivot the saw assembly 30 within the limits of the slot 42. Means (not shown) are provided to ensure that the channel sections 40 slide along the tracks 22 so that the pivot axis remains at the centre 50.

The bars 32,34 mount a motor frame or carriage 52 which can slide along the bars 32,34. The carriage 52 mounts a blade assembly 54 about a pivot 56. The blade assembly 54 (FIG. 3) comprises a motor 57 having rotation axis 58 and output pulley 60 driving a belt 62. Blade assembly 54 includes a layshaft 64 driven by the belt 62, the layshaft 64 itself driving a belt 66. The rotation axis 68 of the layshaft 64 is parallel to the axis 58 of the motor 57. Finally, the blade assembly 54 mounts a blade axle 70, substantially parallel to the axis of the layshaft 64, carrying a saw blade 72. The saw blade 72 is received between arms 74a,74b of the blade assembly 54 which each carry a bearing 76,78 mounting either end of the blade axle 70. The blade axle 70 is in the form of a bolt, although any other appropriate shaft could alternatively be used. Each bearing 76,78 is retained in place by a circlip 80. The saw blade 72 is clamped between washers 82,84 by nut 86 screwed on to the threaded end of blade axle 70. One of the washers 82 includes a pulley for drive belt 66.

Figure 3:
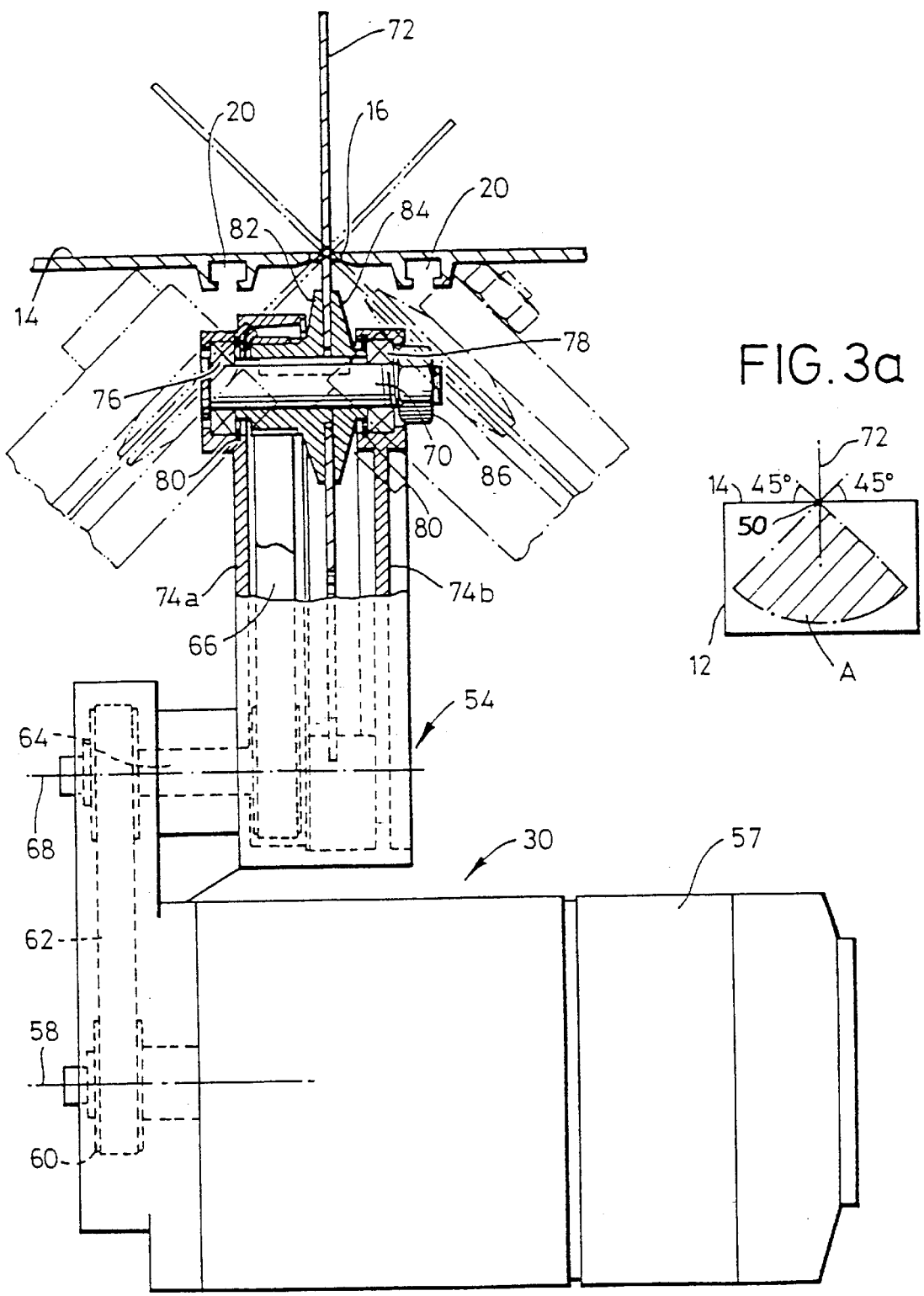
FIG. 3 is a section on the line III—III in FIG. 2.

The arrangement described above has been developed to enable the saw blade 72 to perform bevel cuts on either side of the vertical position shown in FIG. 3. More particularly, the saw blade 72 can be swung through an angle of 45° or more in either direction about its vertical position due to the compact nature of the "stepped" drive from the motor 57 to the blade axle 70 via the layshaft 64. As can be seen from FIG. 3a, it is intended for the saw blade 72 to take up any orientation between 45° to either side of the vertical position of the blade 72. In this event, the motor and blade assembly which bevels with the blade must lie within the sides of envelope A if there is to be no contact with the under side of the table 14 when full bevelling occurs.

Thus, the blade axle 70 mounting arrangement, which is near the corner of the envelope A, must be as small as possible, otherwise clashing of the mounting with the underside of the table 14 will occur. Further, by providing a step in the drive train from the motor 57 to the saw blade 72, the step being formed by layshaft 64, the motor 57 is more centrally positioned under the saw blade 72 and lies primarily within the envelope A (FIG. 3a).

Figure 2:
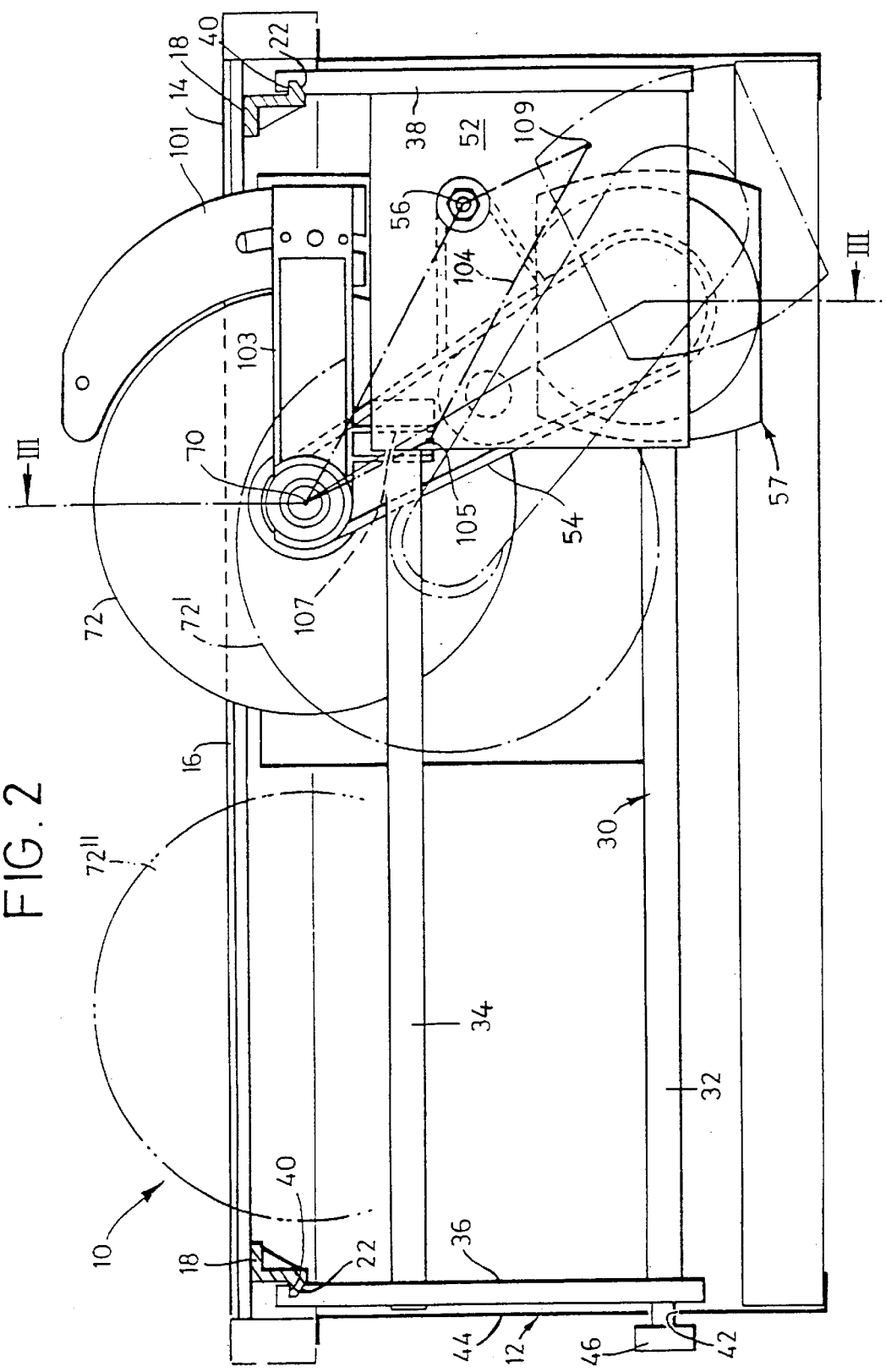
FIG. 2 is a side view of the saw of FIG. 1.

Even with the arrangement described above, it is not necessarily possible to achieve full bevelling in either direction (especially if the washers 82,84 are close to the underside of the table 14 in a maximum depth-of-cut position) without first withdrawing the saw blade 72 a small amount. In FIG. 2, withdrawal of the saw blade 72 is achieved by pivoting the motor/blade assembly 54 about the pivot axis 56 by means not shown. It is, in any event, desirable to be able to reduce the depth of cut right down to zero by lowering the saw blade 72, and this is shown in dotted lines at 72' in FIG. 2.

As can be seen in FIG. 2, a riving knife 101 is shown attached to a riving knife support 103 mounted about the axis of the blade axle 70. The riving knife 101 follows the saw blade 72 during cutting to prevent a cut workpiece from closing up and gripping the saw blade 72 as it passes the rear of the saw blade 72. Thus, if the saw blade 72 is lowered relative to the surface of the table 14 due to pivoting of the blade assembly 54 about pivot axis 56, it is desirable that the riving knife 101 be retained in the same position relative to the saw blade 72. Hence, to ensure that the riving knife 101 remains in the same orientation relative to the saw blade 72, the riving knife support 103 must be rotated clockwise in FIG. 2 about the axis of the blade axle 70 during lowering of the saw blade 72. This rotation of the riving knife support 103 may be achieved by virtue of a quadrilateral linkage which exists nominally between the fixed pivot axis 56 and blade axle 70, and through a quadrilateral lever 104 pivoted at one end to a pivot 105 mounted on an extension 107 of the riving knife support 103 and a second fixed pivot 109 on the carriage 52 as shown in FIG. 2. Thus, as the saw blade 72 is lowered, fixed pivot points 56 and 109 drive the quadrilateral linkage to force pivot point 105 clockwise around blade axle 70. Thus, the riving knife 101 remains in the same position relative to the saw blade 72 with the riving knife support 103 substantially horizontal.

Figure 6:
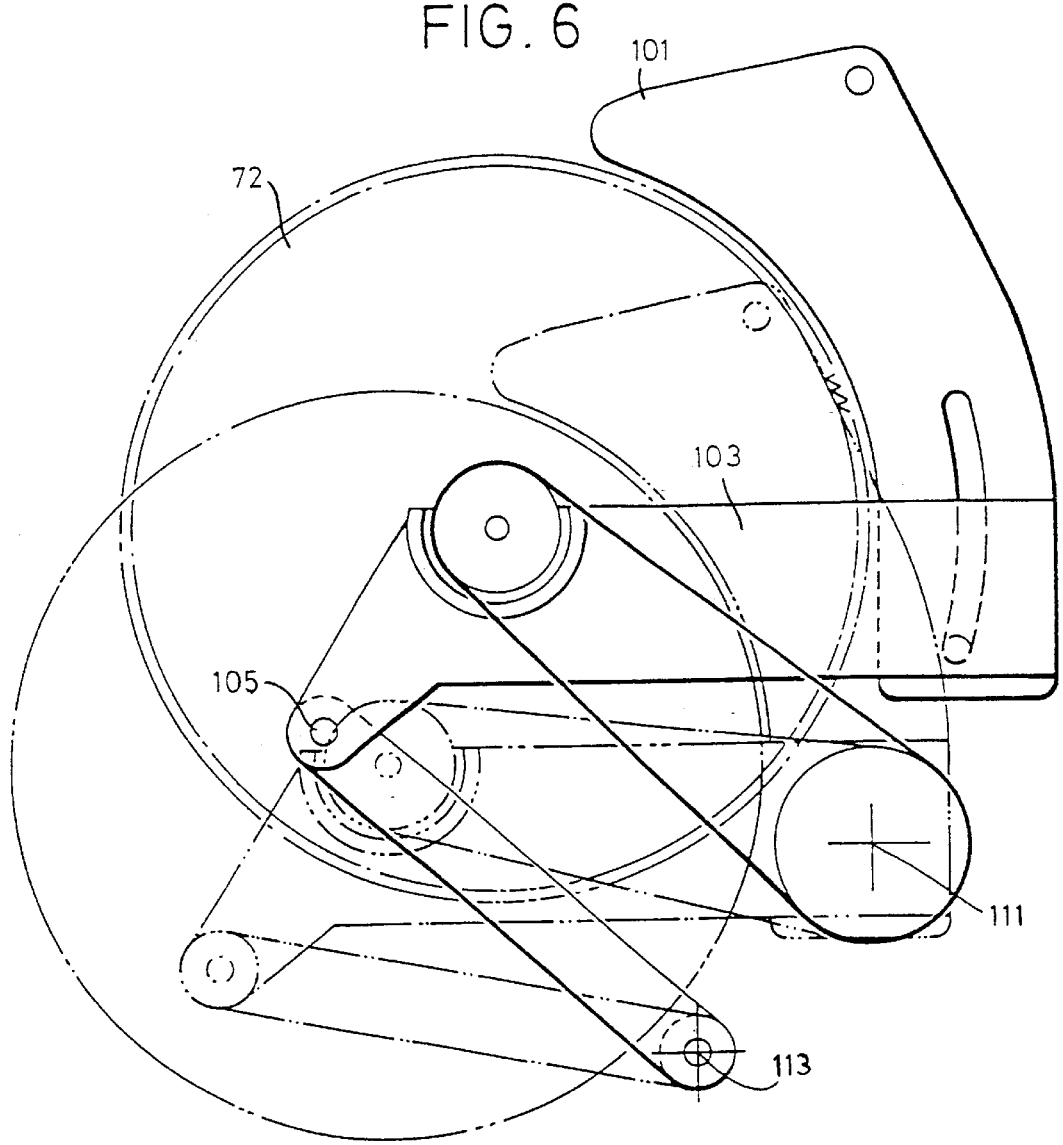
FIG. 6 is a schematic side view of another embodiment of saw showing a quadrilateral linkage.

Another form of quadrilateral linkage is shown in FIG. 6, but in this embodiment the fixed pivots are shown numbered 111 and 113. Other arrangements could, of course, alternatively be used.

As will be appreciated, the bevel table saw described above is of the sliding type so that cross-cutting is possible and this is achieved by sliding the motor carriage 52 along the bars 32,34 so that the blade 72 is advanced through a workpiece supported on the table 14 to the position of the blade shown in dotted lines at 72" in FIG. 2.

Figure 4:
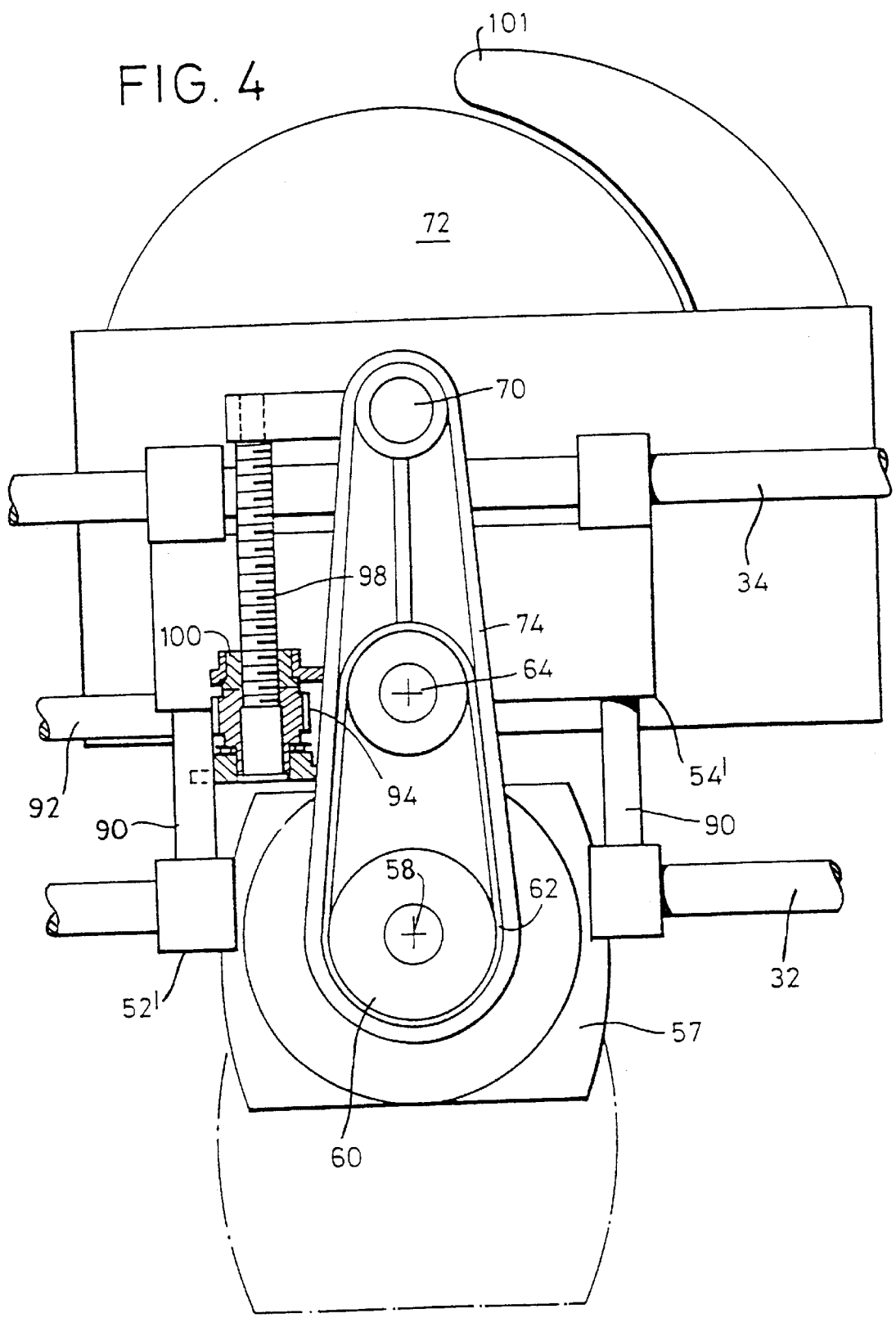
FIG. 4 is a detailed side view, like FIG. 2, of an alternative embodiment of bevel table saw according to the present invention.
Figure 5:
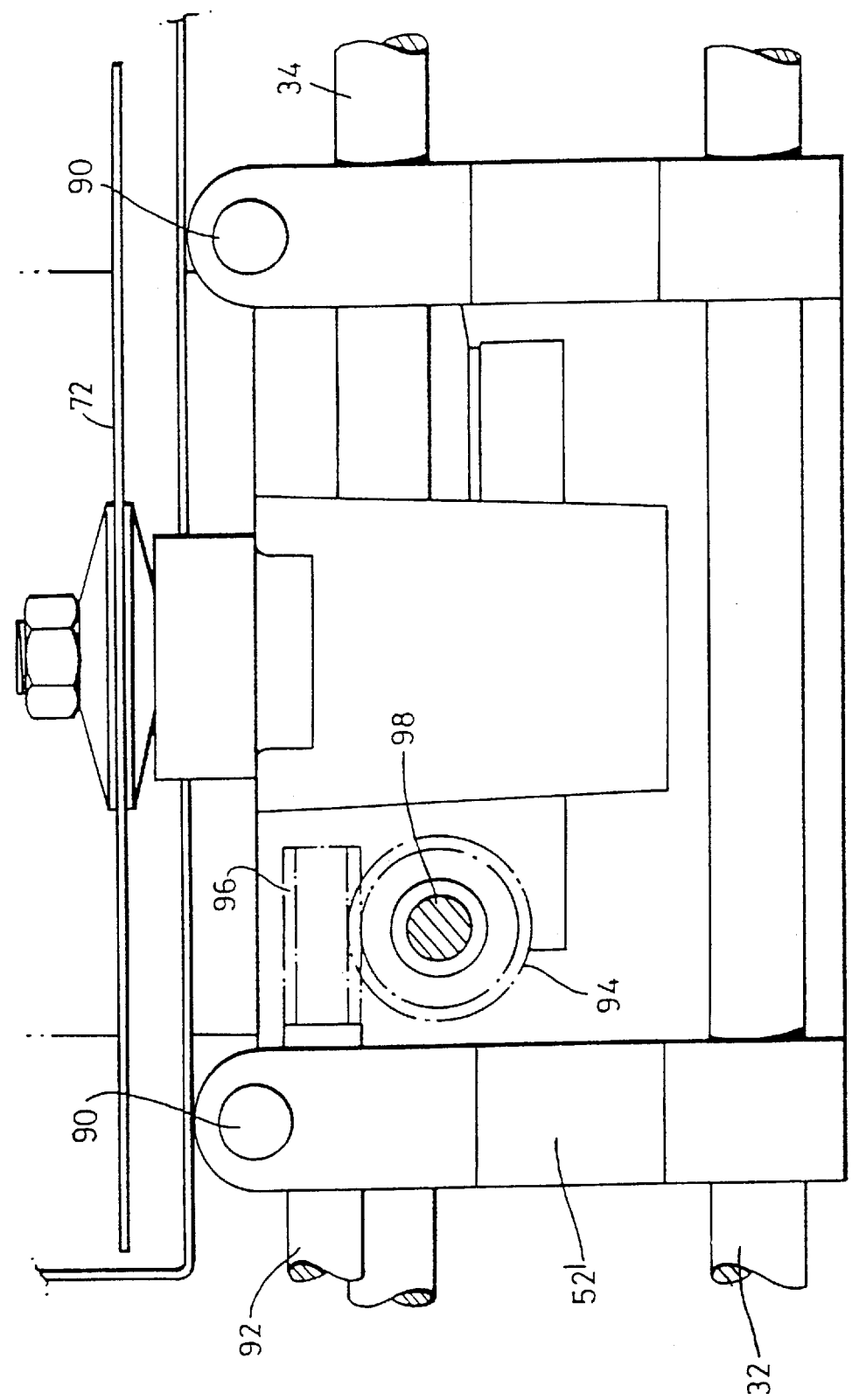
FIG. 5 is a top plan view of the saw of FIG. 4.

Finally, an alternative rise and fall arrangement for the saw blade 72 is shown in FIGS. 4 and 5. Here, blade 72 is mounted on blade axle 70 mounted in arms 74 of blade assembly 54'. A layshaft 64 drives the axle 70 and is itself driven by belt 62 from drive shaft 58. Blade assembly 54' is slidable on posts 90 received within the four corners of motor carriage 52' which is slidably mounted on the bars 32,34. Carriage 52' has bar 92 connected thereto which extends parallel to the bars 32,34 and through an arcuate slot (not shown) in the end face 44 of the saw frame 12. The knob (also not shown) on the bar 92 outside the frame 12 serves two purposes. Firstly, it enables the carriage 52' to be pulled along the bars 32,34 to effect the cross-cutting mentioned above. Secondly, rotation of the knob rotates the bar 92 which at its end is provided with a worm drive 96. The worm drive 96 coacts with a pinion 94 to rotate threaded bush 100 disposed on the carriage 52'. A threaded shaft 98 is mounted on the motor/blade assembly 54' and is fixedly disposed parallel to the posts 90. Rotating the bush 100 screws the shaft 98 up and down inside the bush 100 so that the motor/blade assembly 54' is raised and lowered as desired.

It will of course be understood that the present invention has been described above purely by way of example, and that modifications of detail can be made within the scope of the invention.

I claim:
1. A bevel table saw comprising
   a table supported by a frame, the table defining a table surface having a saw blade slot therein, and
   a blade assembly pivotably mounted to the frame below the table,
   the blade assembly comprising
      a motor having a drive shaft,
      a layshaft driven by the drive shaft via a first belt,
      a blade axle driven by the layshaft via a second belt, and
      a saw blade disposed on the blade axle and extending through said saw blade slot,
   wherein the blade assembly is pivotable substantially 45° in first and second directions from a position in which the saw blade is substantially perpendicular to the table surface to respective first and second positions wherein said saw blade is substantially 45° with respect to said table surface in each of said first and second positions.

2. A saw as claimed in claim 1, wherein the blade axle carries a pair of washers between which the saw blade is held.

3. A saw as claimed in claim 1, wherein the axis of the layshaft is substantially parallel to both the axis of the blade axle and the axis of the drive shaft.

4. A saw as claimed in claim 1, further comprising adjusting means for adjusting saw blade height relative to the table surface.

5. A saw as claimed in claim 4,
wherein the adjusting means comprise a worm drive which engages a pinion to raise and lower the saw blade relative to the table surface.

6. A saw as claimed in claim 1, wherein the blade assembly further comprises a carriage movably mounted on the frame, said carriage being longitudinally moveable relative to the frame.

7. A saw as claimed in claim 1, wherein the blade assembly comprises a pair of arms, and the blade axle extends between and is supported by the pair of arms.

8. A saw as claimed in claim 7, wherein the blade assembly further comprises at least one bearing disposed on one of said pair of arms, and the blade axle is supported by said at least one bearing.

9. A saw as claimed in claim 7, wherein the blade assembly further comprises at least one bearing disposed in each one of said pair of arms, and the blade axle is supported by said bearings.

10. A saw as claimed in claim 7, wherein the saw blade is disposed between the pair of arms.

11. A saw as claimed in claim 1, wherein distance between the saw blade and the first belt is larger than distance between the saw blade and the second belt.

12. A saw comprising:
a table supported by a frame, the table defining a table surface having a saw blade slot therein, and
a blade assembly pivotably mounted to the frame below the table,
the blade assembly comprising
a pair of arms,
a blade axle extending between and being supported by the pair of arms,
a layshaft operatively connected to the blade axle for driving the blade axle,
a motor having a drive shaft, the drive shaft operatively connected to the layshaft for driving the layshaft, and
a saw blade disposed on the blade axle and extending through said saw blade slot,
wherein the blade assembly is pivotable substantially 45° in first and second directions from a position in which the saw blade is substantially perpendicular to the table surface to respective first and second positions wherein said saw blade is substantially 45° with respect to said table surface in each of said first and second positions.

13. A saw as claimed in claim 12, wherein the blade assembly further comprises at least one bearing disposed on one of said pair of arms, and the blade axle is supported by said at least one bearing.

14. A saw as claimed in claim 12, wherein the blade assembly further comprises at least one bearing disposed in each one of said pair of arms, and the blade axle is supported by said bearings.

15. A saw as claimed in claim 12, wherein the saw blade is disposed between the pair of arms.

16. A saw as claimed in claim 12, wherein the blade assembly further comprises a carriage movably mounted on the frame, said carriage being longitudinally moveable relative to the frame.

17. A saw as claimed in claim 12, further comprising adjusting means for adjusting saw blade height relative to the table surface.

18. A saw as claimed in claim 17, wherein the adjusting means comprises a worm drive which engages a pinion to raise and lower the saw blade relative to the table surface.

19. A saw as claimed in claim 12, wherein the blade assembly further comprises a layshaft driven by the drive shaft via a first belt, and driving the blade axle driven via a second belt.

20. A saw as claimed in claim 19, wherein the axis of the layshaft is parallel to both the axis of the blade axle and the axis of the drive shaft.

21. A saw as claimed in claim 19, wherein distance between the first belt and the saw blade is larger than distance between the second belt and the saw blade.

* * * * *